Patented July 25, 1939

2,167,113

UNITED STATES PATENT OFFICE 2,167,113

VEGETABLE OIL PRODUCT

Carl H. Haurand, North Plainfield, and Ralph H. Neal, Bayonne, N. J., and Hans W. Vahlteich, New York, N. Y., assignors to The Best Foods, Inc., New York, N. Y., a corporation of Delaware No Drawing. Application March 27, 1936, Serial No. 71,176

13 Claims. (Cl. 99—122)

This invention relates to an improved margarine including a particular hydrogenated vegetable oil having superior characteristics for use as a margarine oil.

As pointed out in our copending application Serial No. 719,514, filed April 7, 1934, and granted as Patent No. 2,047,530 it is desirable to produce a finished margarine answering numerous exacting requirements in order to make it suitable as a butter substitute and, in some respects, even an improvement over normal dairy butter. These requirements include the ability of the margarine to melt properly at the temperature of the mouth so that the flavor will be quickly released, and the avoidance of a product having a chewy tendency. The product also must stand up under various and conflicting conditions, for example, it cannot be too hard or brittle at ice box temperatures nor too soft and runny at ordinary summer room temperatures. These various requirements make the selection of the oil from which the margarine is produced a very important and difficult one, since seemingly slight variations in the constituents of an oil or the method by which it is prepared may make a very great difference in its suitability as a good margarine oil.

It is an object of the present invention to provide a margarine or butter substitute of improved characteristics. Other objects will become apparent.

We have now found that the oil used in preparing the margarine oil should be properly selected and the hydrogenation of the oil should be carried out in such a manner as to produce an oil in which the concentration of glycerides of iso-oleic acid exceeds the concentration of glycerides of saturated fatty acids. It should be explained that natural vegetable oils contain no significant amount of glycerides of iso-oleic acid but that these are formed in the oil during the process of hydrogenation. In the course of the hydrogenation the amount of iso-oleic glycerides rises to a maximum dependent upon the type of starting material and on the method and conditions of reaction and then, upon further hydrogenation, decreases due to conversion into stearin, a saturated fatty acid glyceride. We prefer to carry out the hydrogenation in such manner as to produce an oil as high as possible in iso-oleic acid glycerides, because we have found that the higher their concentration in relation to the concentration of saturated fatty acid glycerides the more desirable will be the physical properties of the fats of which they are constituents. In our preferred hydrogenated oil, the concentration of glycerides of saturated acids is less than 20% and the concentration of glycerides of iso-oleic acid is greater than 20%. However, the glycerides of the saturated acids may vary considerably, for example, improved oils may be prepared having a concentration of glycerides of saturated acids of, for instance, 18 to 25%, the glycerides of iso-oleic acid in each instance being in greater amount than the glycerides of the saturated acids. As indicated above, however, it is preferred to have the glycerides of iso-oleic acid about 20 to 25%, and even higher values may be used. The concentration of glycerides of linoleic acid should be not over 10% and preferably from 0 to 5%. The remainder of the oil would be made up principally of glycerides of oleic acid, although small quantities of other compounds and reaction products would be present. With an oil having the relationship of glycerides of fatty acids within the ranges described above, a melting point-setting point relationship may be obtained which makes the oil particularly useful in the preparation of butter substitutes where these features are of special importance in obtaining the desired characteristics in the finished product. The oil may also have other uses where such a relationship is of value.

In preparing our improved margarine oil we select as our starting material various oils or mixtures of oils containing relatively low percentages of saturated fatty acid glycerides and relatively high percentages of linolein or other glycerides of fatty acids more unsaturated than oleic, that is, containing more than one double bond. Examples of such oils are soya bean oil, sunflower oil, and corn oil. These and similar oils may be used either alone or in mixtures of one or more of them, as the starting material for our improved hydrogenated margarine oil. We may also use in admixture with one or more of the above oils other oils or combinations of oils which in themselves would be less desirable because of containing higher percentages of saturated fatty acid glycerides and/or lower percentages of linoleic acid glycerides. Oils of this latter description are cottonseed oil, peanut oil, sesame oil and other oils of similar composition. The quantity of oils of this nature admixed with one or more oils of the first group should be such as not to give too high a percentage of saturated fatty acid glycerides in the final hydrogenated product. We may also employ as a starting material for our improved hydrogenated product, oils which, while normally containing relatively high percentages of saturated fatty acid glycerides, have been processed, for example by chilling, a process commonly known as winterizing, to remove a portion of such glycerides. For instance, a winterized cottonseed oil may be used in place of or together with the soya bean, sunflower and/or corn oils.

An oil or oil mixture as described above may be subjected to the hydrogenation process described in our aforementioned application Serial No. 719,514 wherein the oil is heated to about 250 to 300° F. and about .05 to .50% by weight (calculated as metallic nickel to oil being hydrogenated) of a nickel catalyst whose activity has been established by test is then added. Hydrogen gas is passed into the vessel containing the oil and catalyst, the oil being vigorously and thoroughly agitated throughout the reaction, while the temperature is maintained below about 400° F. and the pressure at about 20 to 100 lbs. per square inch. The hydrogenation is continued until an oil is obtained having the desired relationship of glycerides of iso-oleic acid to glycerides of saturated fatty acids, and the proper melting point for a margarine oil.

As an example of an oil suitable for use in a margarine embodying our invention, a mixture composed of 50% cottonseed oil and 50% soya bean oil may be hydrogenated as described in our aforementioned application, to give a final product having the following characteristics:

Melting point of the hydrogenated oil
    ° F. (Wiley) __ 93.6
Setting point of the hydrogenated oil
    ° C. (78.4° F.) __ 25.8
Iodine number of hydrogenated oil _____ 72.9
Iodine number of the total fatty acids _____ 76.4
Iodine number of the total solid fatty acids_ 47.6
Iodine number of the unsaturated fatty acids _____ 95.4
Total solid acids calculated as fatty acid
    percent of the total fatty acids __ 42.2
Unsaturated fatty acids _____do____ 80.1
Total oleic acids (oleic and iso-oleic) _do____ 75.3
Saturated fatty acids _____do____ 19.9
Iso-oleic acid _____do____ 22.3
Liquid oleic acid _____do____ 53.0
Linoleic acid _____do____ 4.8

The melting point, setting point and iodine number determinations referred to above were made, and the percentages of fatty acids equivalent to the glycerides in the oil were calculated as described in the aforementioned application Serial No. 719,514. The percentages are given in terms of fatty acids, although it is obvious that the fatty acids would be present in the oil as glycerides.

The above described oil, when emulsified with cultured milk and chilled in the usual way to prepare margarine will produce a product having a firmer body and one which will be drier, i. e., tend to stand up better in warm weather, as compared with a produce made from an oil having a smaller proportion of glycerides of iso-oleic acid than glycerides of saturated fatty acids. It will also have the desirable characteristic of melting quickly in the mouth.

As another example of an oil suitable for use in a margarine embodying our improvement, soya bean oil may be hydrogenated as described above to give an oil having the following characteristics:

Melting point of the hydrogenated oil
    ° F. (Wiley) 94.1
Setting point of the hydrogenated oil
    ° C. (80° F.) __ 26.6
Iodine number of the hydrogenated oil _____ 74.8
Iodine number of total fatty acids _____ 78.4
Iodine number of total solid fatty acids ____ 49.1
Iodine number of unsaturated acids _____ 97.2
Total solid fatty acids
    percent of the total fatty acids __ 42.4
Unsaturated fatty acids _____do____ 80.7
Saturated fatty acids _____do____ 19.3
Total oleic acids (oleic and iso-oleic) _do____ 74.1
Iso-oleic acid _____do____ 23.1
Liquid oleic acid _____do____ 51.0
Linoleic acid _____do____ 6.4

Although reference has been made to the oil being particularly suited for use as a margarine oil, it may be useful for other purposes and it is not intended to restrict its use to use as a margarine oil. Also, it is apparent that other oils or other combinations of oils may be used as the starting materials and other procedures may be used to produce an oil of the characteristics described herein. The examples given are intended as illustrations and not to limit the scope of the invention. The terms used have been used in their descriptive sense and not as terms of limitation and it is intended that all equivalents thereof be included within the scope of the appended claims.

What we claim is:

1. A margarine comprising an emulsion of milk with an oil comprising partially hydrogenated vegetable oil containing a greater percentage of glycerides of iso-oleic acid than glycerides of saturated fatty acids.

2. A margarine as defined in claim 1 in which the oil contains less than 20% of glycerides of saturated fatty acids.

3. A margarine as defined in claim 1 in which the oil contains less than 20% of glycerides of saturated fatty acids and more than 20% of glycerides of iso-oleic acid.

4. A margarine as defined in claim 1 in which the oil contains 18 to 25% of glycerides of saturated fatty acids, 20 to 25% of glycerides of iso-oleic acid and 0 to 10% of glycerides of linoleic acid.

5. A margarine as defined in claim 1 in which the oil contains 0 to 10% of glycerides of linoleic acid.

6. A margarine as defined in claim 1 in which the oil contains 0 to 5% of glycerides of linoleic acid.

7. A margarine as defined in claim 1 in which the oil contains 18 to 25% of glycerides of saturated fatty acids, 20 to 25% of glycerides of iso-oleic acid and 0 to 5% of glycerides of linoleic acid.

8. A margarine comprising an emulsion of milk with an oil comprising partially hydrogenated vegetable oil containing about 18 to 25% of glycerides of saturated fatty acids and containing a greater percentage of glycerides of iso-oleic acid than glycerides of saturated fatty acids.

9. A margarine comprising an emulsion of milk with an oil comprising one or more partially hydrogenated vegetable oils of the group consisting of soya bean oil, winterized cottonseed oil, sunflower oil, corn oil and containing about 18 to 25% of glycerides of saturated fatty acids and containing glycerides of iso-oleic acid in greater proportions than the glycerides of saturated fatty acids.

10. A margarine comprising an emulsion of milk with an oil comprising one or more partially hydrogenated vegetable oils of the group consisting of soya bean oil, winterized cottonseed oil, sunflower oil, corn oil, together with one or more partially hydrogenated vegetable oils of the group consisting of cottonseed oil, sesame oil and peanut oil, said oil containing about 18 to 25% of glycerides of saturated fatty acids and containing glycerides of iso-oleic acid in greater amount than the glycerides of saturated fatty acids.

11. A margarine comprising an emulsion of milk with an oil comprising about 50% soya bean oil and about 50% cottonseed oil, partially hydrogenated and containing about 18 to 25% of glycerides of saturated fatty acids and containing glycerides of iso-oleic acid in greater amount than the glycerides of saturated fatty acids.

12. A margarine as defined in claim 1 containing an oil having a melting point of about 92 to 96° F.

13. A margarine as defined in claim 8 containing an oil having a melting point of about 92 to 94° F. and a setting point of about 25.5 to 26.5° C.

CARL H. HAURAND.
RALPH H. NEAL.
HANS W. VAHLTEICH.